US012650219B2

(12) United States Patent
Guo et al.

(10) Patent No.: US 12,650,219 B2
(45) Date of Patent: Jun. 9, 2026

(54) WATERPROOF LAMP WITH OUTSIDE KNOB

(71) Applicant: SAVANT TECHNOLOGIES LLC, East Cleveland, OH (US)

(72) Inventors: Guangting Guo, Shanghai (CN); Kun Xiao, Shanghai (CN); Hai Huang, Shanghai (CN); Tiantian Fang, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 18/989,965

(22) Filed: Dec. 20, 2024

(65) Prior Publication Data

US 2025/0347405 A1 Nov. 13, 2025

(30) Foreign Application Priority Data

Dec. 27, 2023 (CN) ......................... 202323590716.5

(51) Int. Cl.
*F21V 23/04* (2006.01)
*F21V 29/70* (2015.01)
(Continued)

(52) U.S. Cl.
CPC .............. *F21V 23/04* (2013.01); *F21V 29/70* (2015.01); *F21V 31/005* (2013.01); *H05B 47/10* (2020.01)

(58) Field of Classification Search
CPC ........ F21V 23/04; F21V 29/70; F21V 31/005; H05B 47/10
See application file for complete search history.

(56) References Cited

U.S. PATENT DOCUMENTS 9,657,928 B1 * 5/2017 Jacobson .............. F21V 29/763
10,480,722 B2 * 11/2019 Frye ........................ F21K 9/232
(Continued)

FOREIGN PATENT DOCUMENTS

CN 211040528 U 7/2020
CN 211875718 U * 11/2020
(Continued)

OTHER PUBLICATIONS

Wang et al., Waterproof LED PAR lamp with color modulation key switch, 2020, CN211875718U, https://worldwide.espacenet.com/patent/search/family/073251209/publication/CN211875718U?q=pn%3DCN211875718U (Year: 2022).*
(Continued)

*Primary Examiner* — James R Greece
*Assistant Examiner* — Michael Chiang
(74) *Attorney, Agent, or Firm* — WOOD IP LLC; Theodore A. Wood

(57) ABSTRACT

Provided is a waterproof lamp including a lamp housing having a circumferential side wall and an opened housing opening, a lamp cover, connected to the lamp housing and covering the opening, a light source plate, arranged in the housing inner space, and a lens, mounted on the plate and electrically connected to the plate, a switching unit for switching correlated color temperature or power of the lamp, the switching unit includes a switch having switching gears and electrically connected to the plate, and an operation knob that includes a disk-shaped body and a cylindrical connecting portion extending from one side of the body, the body is located outside the housing, and a portion of the body abuts the side wall, and the connecting portion is connected to the switch through a through hole on the housing so gear switching of the switch can be driven by rotation of the body.

17 Claims, 8 Drawing Sheets

(51) Int. Cl.
*F21V 31/00* (2006.01)
*H05B 47/10* (2020.01)

(56) References Cited

U.S. PATENT DOCUMENTS

| | | | | |
|---|---|---|---|---|
| 10,914,429 | B1 | 2/2021 | Liu | |
| 2016/0258600 | A1* | 9/2016 | Jain | F21K 9/65 |
| 2022/0042658 | A1* | 2/2022 | Chen | F21K 9/238 |
| 2022/0307663 | A1* | 9/2022 | Yao | F21V 23/006 |

FOREIGN PATENT DOCUMENTS

| | | | | |
|---|---|---|---|---|
| CN | 216281135 | U | * | 4/2022 |
| CN | 218497988 | U | | 2/2023 |

OTHER PUBLICATIONS

Wang et al., Waterproof lamp with multi-gear color matching function and mounting structure, 2022, CN216281135U, https://worldwide.espacenet.com/patent/search/family/081005291/publication/CN216281135U?q=pn%3DCN216281135U (Year: 2022).*

* cited by examiner

WATERPROOF LAMP WITH OUTSIDE KNOB

CROSS-REFERENCE TO RELATED APPLICATIONS

This application claims priority to Chinese Patent Application Serial Number 2023235907165, filed Dec. 27, 2023, which is herein incorporated by reference.

TECHNICAL FIELD

The present application generally relates to the field of lamps, and more particularly relates to a waterproof lamp.

BACKGROUND

A conventional waterproof lamp generally has a single function, for example, the brightness, the correlated color temperature (CCT), and the like cannot be adjusted; therefore, an application scenario of this type of waterproof lamp is single, and different types of waterproof lamps need to be used in different application scenarios, thereby generating high costs. Furthermore, the conventional waterproof lamp generally avoids the design of an opening on a housing, so as to ensure the waterproof performance and meet a waterproof requirement of application scenarios. Therefore, even if components for adjusting the brightness, the CCT, and the like are provided, such components are also arranged at positions such as the base of the waterproof lamp, such that a user can perform an adjustment operation only after detaching the waterproof lamp.

SUMMARY

In order to overcome the described defect existing in the prior art, the present application provides a waterproof lamp, the waterproof lamp includes a lamp housing having a circumferential side wall enclosing a housing inner space, and the lamp housing having an opened housing opening, a lamp cover connected to the lamp housing and covering the housing opening, a light source plate arranged in the housing inner space, and a lens mounted on the light source plate and electrically connected to the light source plate, wherein the waterproof lamp further includes a switching unit configured to be capable of switching the correlated color temperature (CCT) or power of the waterproof lamp, the switching unit includes a switch having a plurality of switching gears, the switch being electrically connected to the light source plate; and an operation knob, comprising a disk-shaped knob body and a cylindrical connecting portion extending from one side of the knob body, wherein the knob body is located outside the lamp housing, and a portion of the knob body abuts against the circumferential side wall, and the cylindrical connecting portion is connected to the switch through a through hole provided on the lamp housing, such that gear switching of the switch can be driven by rotation of the knob body.

Further, the switch is mounted on the light source plate.

Further, the waterproof lamp further includes a switch mounting plate, the switch mounting plate is connected to the light source plate in a manner of intersecting with the light source plate, and the switch is mounted on the switch mounting plate.

Further, the lamp housing further includes an accommodating groove recessed inwards from the circumferential side wall, the accommodating groove having a groove bottom wall and a groove side wall connected between the groove bottom wall and the circumferential side wall, and the through hole is provided in the groove bottom wall.

Further, the lamp housing further includes an accommodating groove recessed inwards from the circumferential side wall, the accommodating groove includes a groove bottom wall and a groove side wall connected between the groove bottom wall and the circumferential side wall, the through hole is provided in the groove bottom wall, and the accommodating groove is arranged adjacent to the housing opening.

Further, the groove side wall has an annular shape and is arranged coaxially with the cylindrical connecting portion, and the inner diameter of the groove side wall is greater than the outer diameter of the cylindrical connecting portion, such that an annular gap is formed between the groove side wall and the cylindrical connecting portion.

Further, the waterproof lamp further includes an annular sealing plug accommodated in the annular gap.

Further, the annular sealing plug includes at least one circumferential connecting groove formed on the inner circumferential surface of the annular sealing plug, and the cylindrical connecting portion comprises at least one circumferential connecting protrusion formed on the outer circumferential surface of the cylindrical connecting portion, and each circumferential connecting protrusion is fitted in a respective circumferential connecting groove.

Further, each circumferential connecting protrusion is fitted in the respective circumferential connecting groove in an interference fit manner, such that when the operation knob rotates, the cylindrical connecting portion can rotate in the accommodating groove together with the annular sealing plug.

Further, the cylindrical connecting portion includes at least one cutout at the end of the cylindrical connecting portion away from the knob body, and the cylindrical connecting portion further comprises at least one clamping claw capable of protruding from the at least one cutout and snap-fitted with the groove bottom wall.

Further, according an embodiment, an axial direction of the operation knob is parallel to the light source plate.

Further, according to an embodiment, an axial direction of the operation knob intersects with the light source plate.

Further, the lamp housing further includes an annular groove recessed inwards from the circumferential side wall, the annular groove is located at a portion of the circumferential side wall abutting against the knob body, and the waterproof lamp further includes a sealing ring arranged in the annular groove.

Further, the lamp housing further includes an annular groove recessed inwards from the circumferential side wall, the annular groove is located at a portion of the circumferential side wall abutting against the knob body, and the waterproof lamp further comprises a sealing ring arranged in the annular groove, and the annular groove is sleeved on the outer side of the accommodating groove.

Further, the waterproof lamp further includes a heat dissipation cup arranged in the housing inner space and connected to the lamp housing, the heat dissipation cup comprises a heat dissipation cup bottom wall and a heat dissipation cup side wall connected to each other, and the light source plate is mounted on the heat dissipation cup bottom wall.

Further, the heat dissipation cup further includes at least one connecting hole formed in the heat dissipation cup side wall, and the lamp housing comprises at least one connecting hook formed on the inner surface of the circumferential side wall, wherein the connecting hook cooperates with a respective connecting hole.

Further, the switch is a rotary switch and includes a rotatable output shaft, the cylindrical connecting portion is coaxially fixed to the output shaft, such that rotation of the output shaft can be driven by rotation of the cylindrical connecting portion.

Further, the switch is a toggle switch and includes an output shaft which can move linearly, the switching unit further includes a pinion and rack mechanism, the pinion and rack mechanism includes a pinion and a rack cooperating with each other, the pinion is coaxially fixed to the cylindrical connecting portion, and the rack is fixed to the output shaft, such that linear movement of the output shaft can be driven by rotation of the cylindrical connecting portion.

The waterproof lamp in the present application can save material and assembly costs, improve the waterproof performance and facilitate user operation.

BRIEF DESCRIPTION OF THE DRAWINGS

The drawings for providing further understanding of the present application constitute a part of the present application, and the illustrative embodiments of the present application and illustrations thereof are used to explain the present application, rather than constitute inappropriate limitation on the present application. In the drawings.

DETAILED DESCRIPTION OF THE EMBODIMENTS

Figure 1:
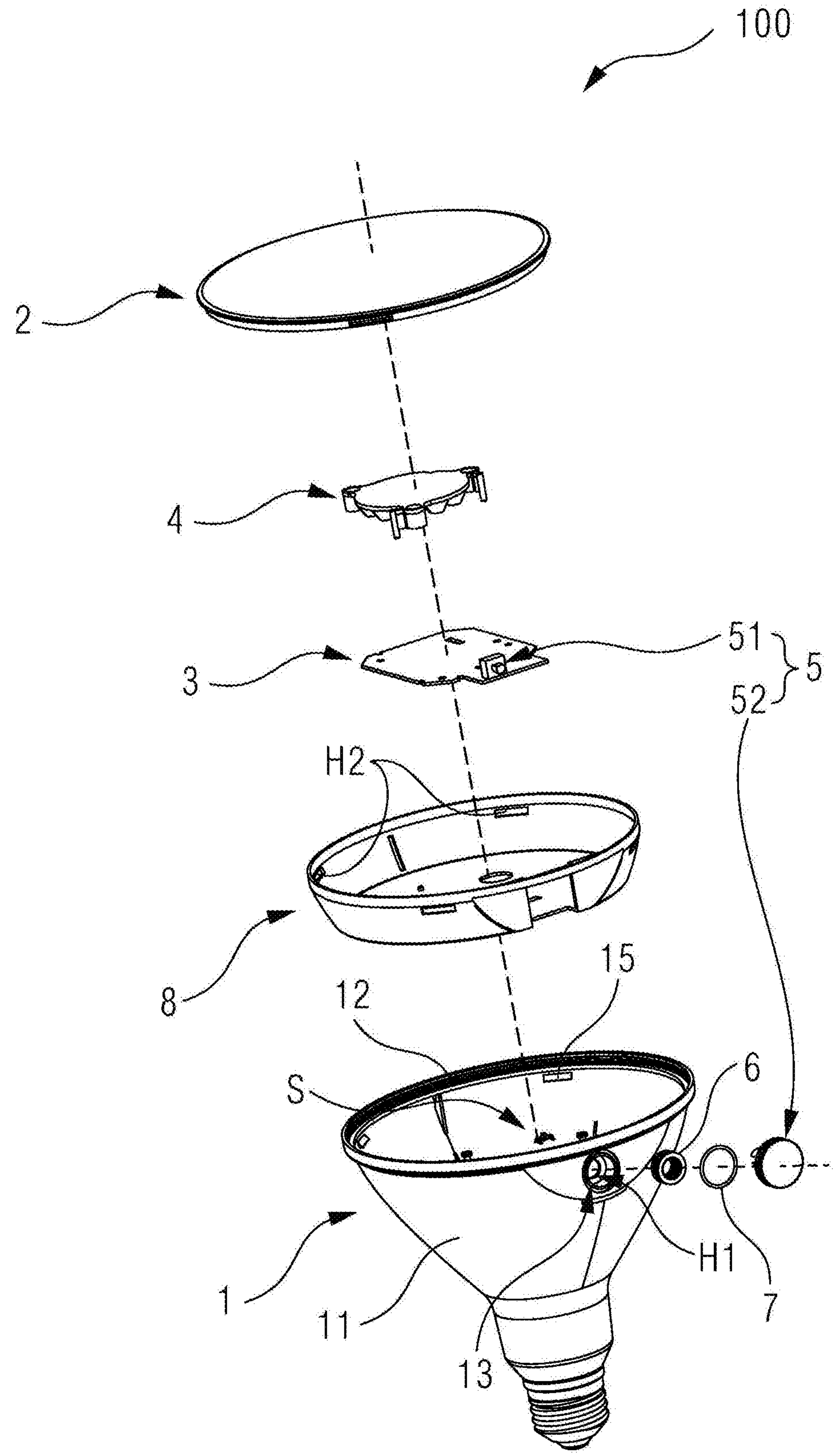
FIG. 1 is a schematic exploded perspective view showing a waterproof lamp according to one embodiment of the present application.
Figure 2:
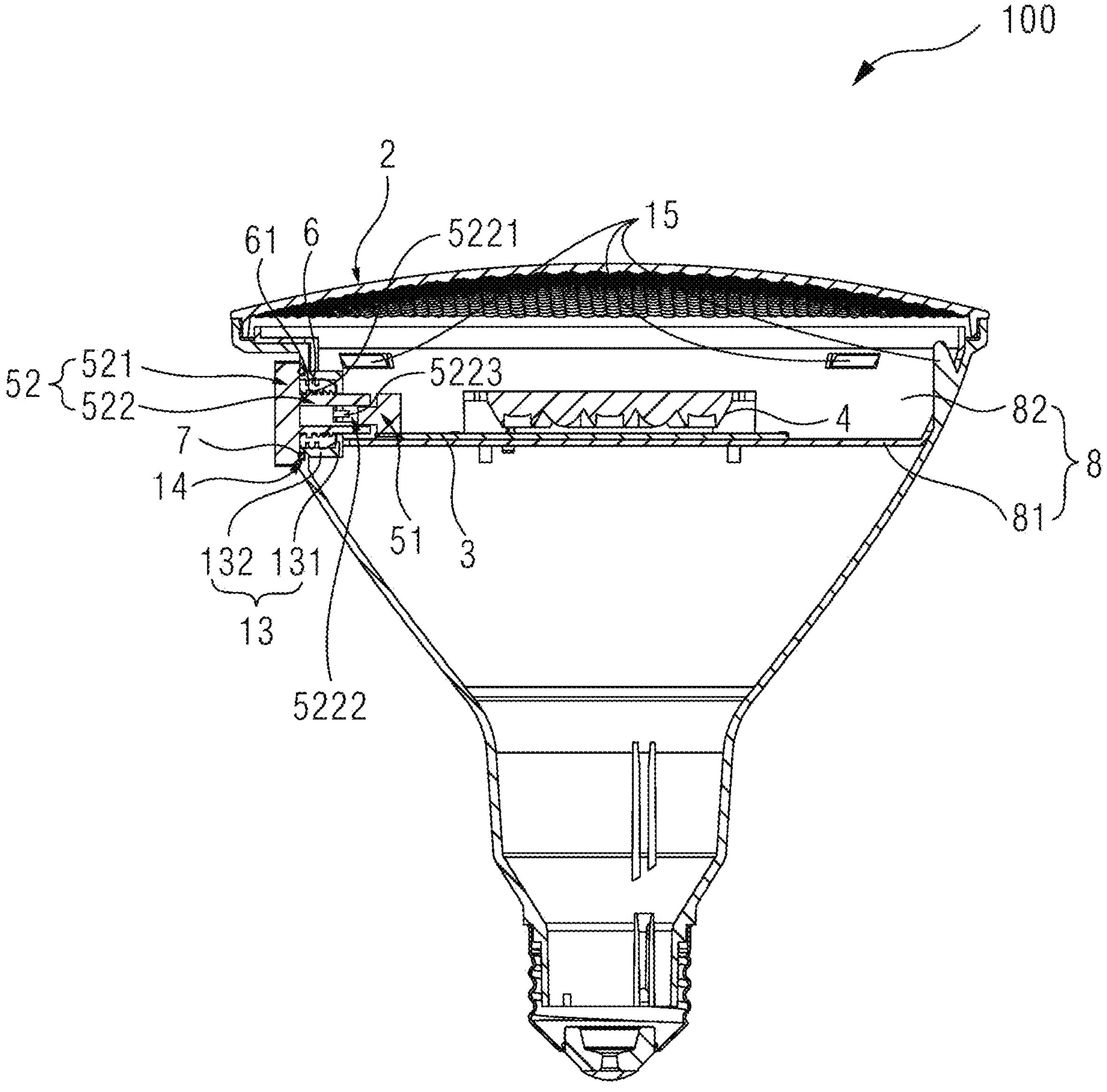
FIG. 2 is a schematic side sectional view showing the waterproof lamp in FIG. 1.
Figure 3:
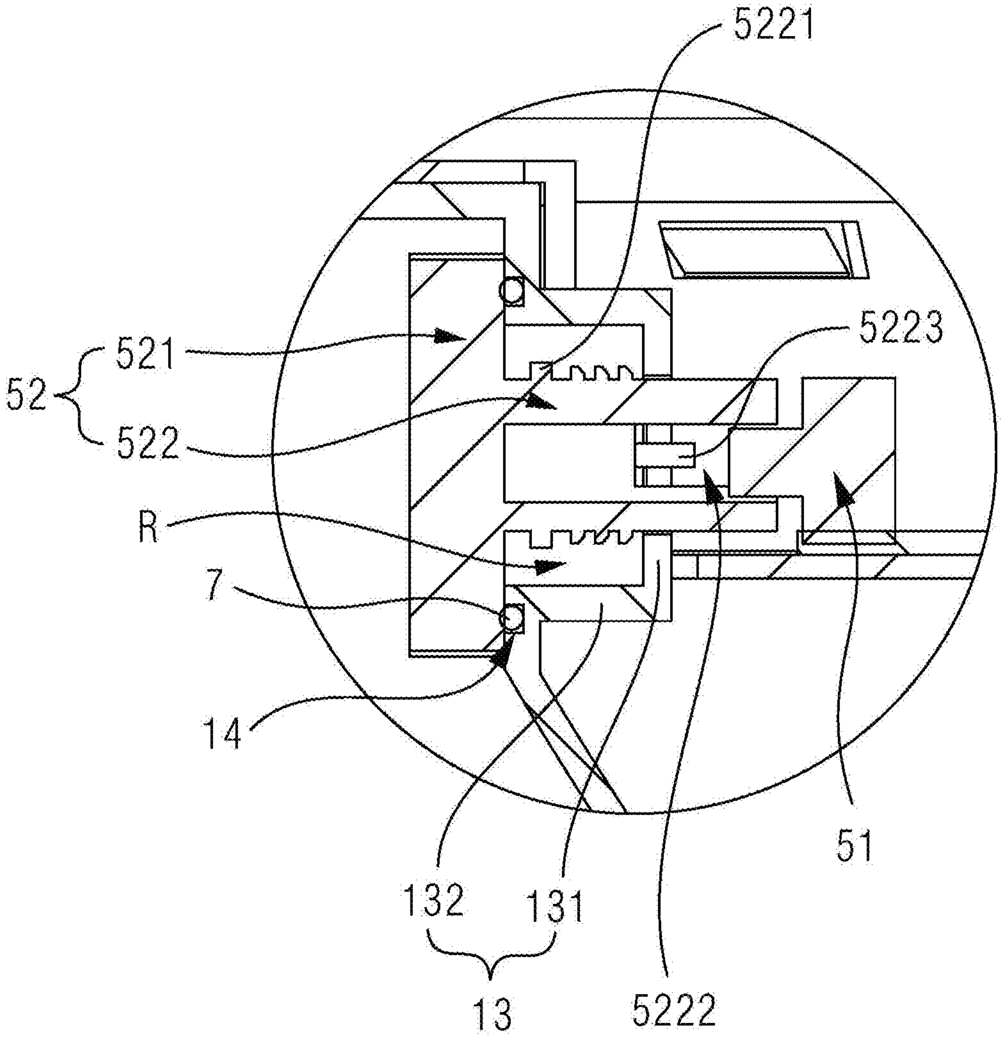
FIG. 3 is a detailed view showing a portion of the waterproof lamp in FIG. 2.
Figure 4:
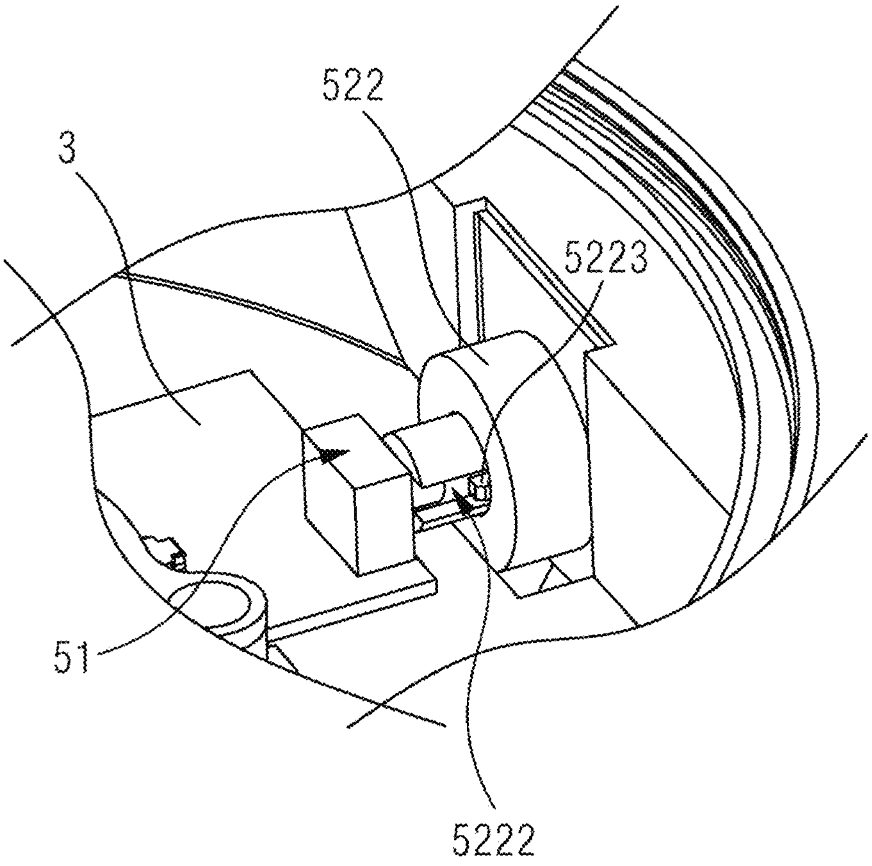
FIG. 4 is a schematic partial perspective view showing a portion of the waterproof lamp in FIG. 1.

Hereinafter, the technical solutions in the embodiments of the present application will be described in detail with reference to the accompanying drawings in the embodiments of the present application. It should be noted that the embodiments in the present application and features in the embodiments can be combined with each other without conflicts.

In the following detailed illustration, reference is made to the accompanying drawings which form a part of the present description, in which specific embodiments which can implement the present application are shown by way of illustration. With regard to the drawings, directional terms, such as "top", "bottom", "inner", "outer", "upper", "lower", "front", "rear", and the like, are used with reference to the directions of the drawings as described. As assemblies of embodiments of the present application may be placed in many different directions, the directional terms are used for purposes of illustration only, and are not intended for limiting. It is to be understood that other embodiments may be used, and structural or logical changes may be made without departing from the scope of the present application. Therefore, the following detailed illustration should not be understood as limiting, and the present application is defined by the appended claims.

Refer to the drawings, the present application provides a waterproof lamp 100. The waterproof lamp 100 may generally comprise a lamp housing 1, a lamp cover 2, a light source plate 3 and a lens 4.

As best shown in FIG. 1, the lamp housing 1 may comprise a circumferential side wall 11 enclosing a housing inner space S, and has an opened housing opening 12. Furthermore, the lamp housing 1 may further comprise a base at the side of the circumferential side wall 11 opposite the housing opening 12. In particular, the lamp housing 1 may have a cup-like shape, and the diameter of the housing inner space S enclosed by the circumferential side wall 11 thereof is tapered from the housing opening 12 towards the base.

The lamp cover 2 can be connected to the lamp housing 1 and cover the housing opening 12 of the lamp housing 1, in particular, the lamp cover 2 and the lamp housing 1 are connected together in a liquid-tight sealing manner.

The light source plate 3 and the lens 4 are both arranged in the housing inner space S. The lens 4 is mounted on the light source plate 3, and is electrically connected to the light source plate 3.

The waterproof lamp 100 may further comprise a switching unit 5 configured to be capable of switching the CCT or power of the waterproof lamp 100. The switching unit 5 may comprise a switch 51 having a plurality of switching gears, and the switch 51 is electrically connected to the light source plate 3. The switching unit 5 may further comprise an operation knob 52, wherein the operation knob 52 comprises a disk-shaped knob body 521 and a cylindrical connecting portion 522 extending from one side of the knob body 521. The knob body 521 is located outside the lamp housing 1, and a portion of the knob body 521 abuts against the circumferential side wall 11. The cylindrical connecting portion 522 is connected to the switch 51 through a through hole H1 provided on the lamp housing 1, such that gear switching of the switch 51 can be driven by rotation of the knob body 521. Accordingly, a user can achieve switching of the switch 51 by simply rotating the operation knob 52 provided outside the lamp housing 1.

In the embodiments shown in FIGS. 1 to 4, the switch 51 may be mounted on the light source plate 3. In other words, the switch 51 and the lens 4 are both mounted on the same light source plate 3, and are electrically connected to the light source plate. According to this, material and assembly costs can be saved.

Figure 5:
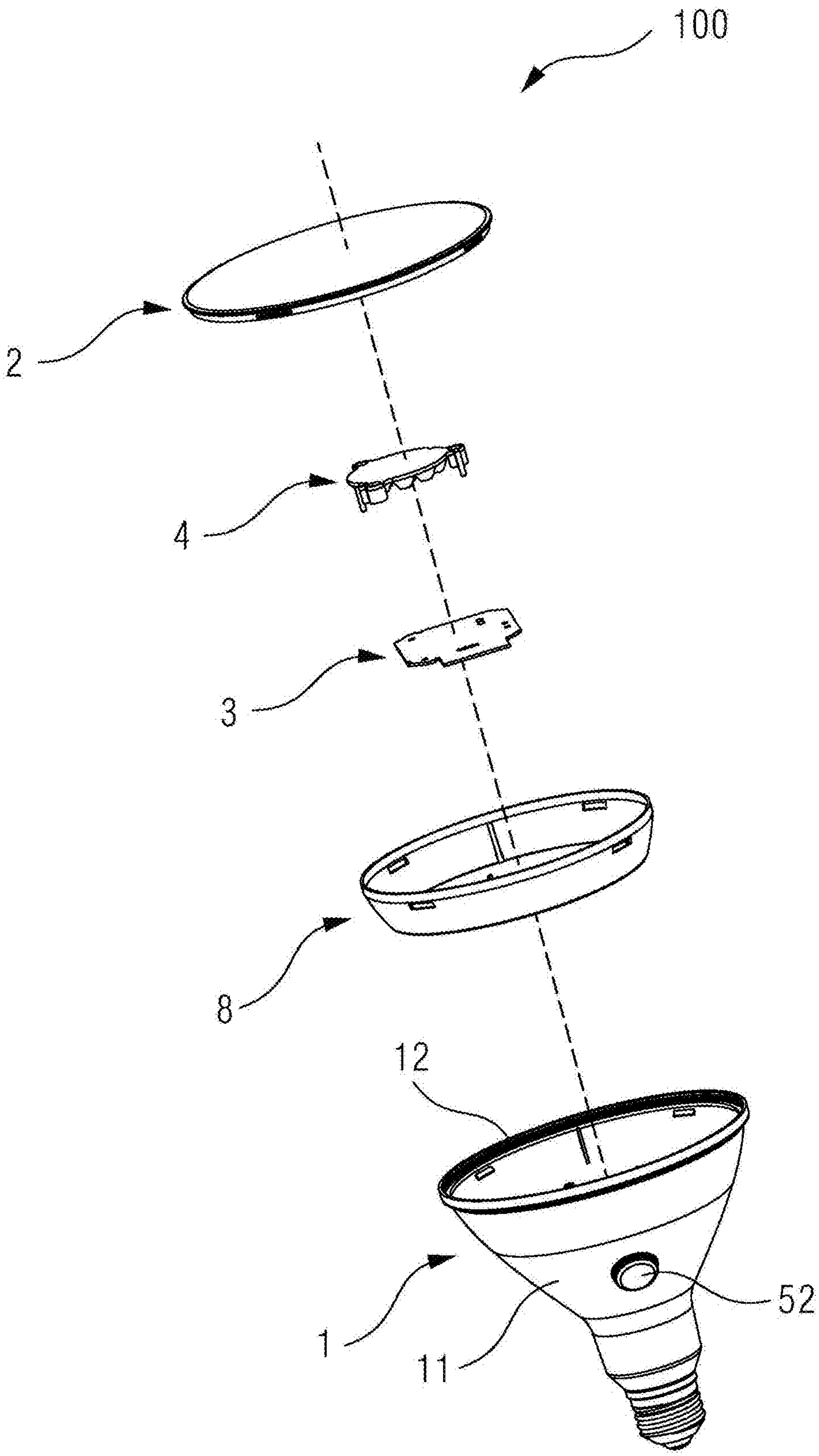
FIG. 5 is a schematic exploded perspective view showing a waterproof lamp according to another embodiment of the present application.
Figure 6:
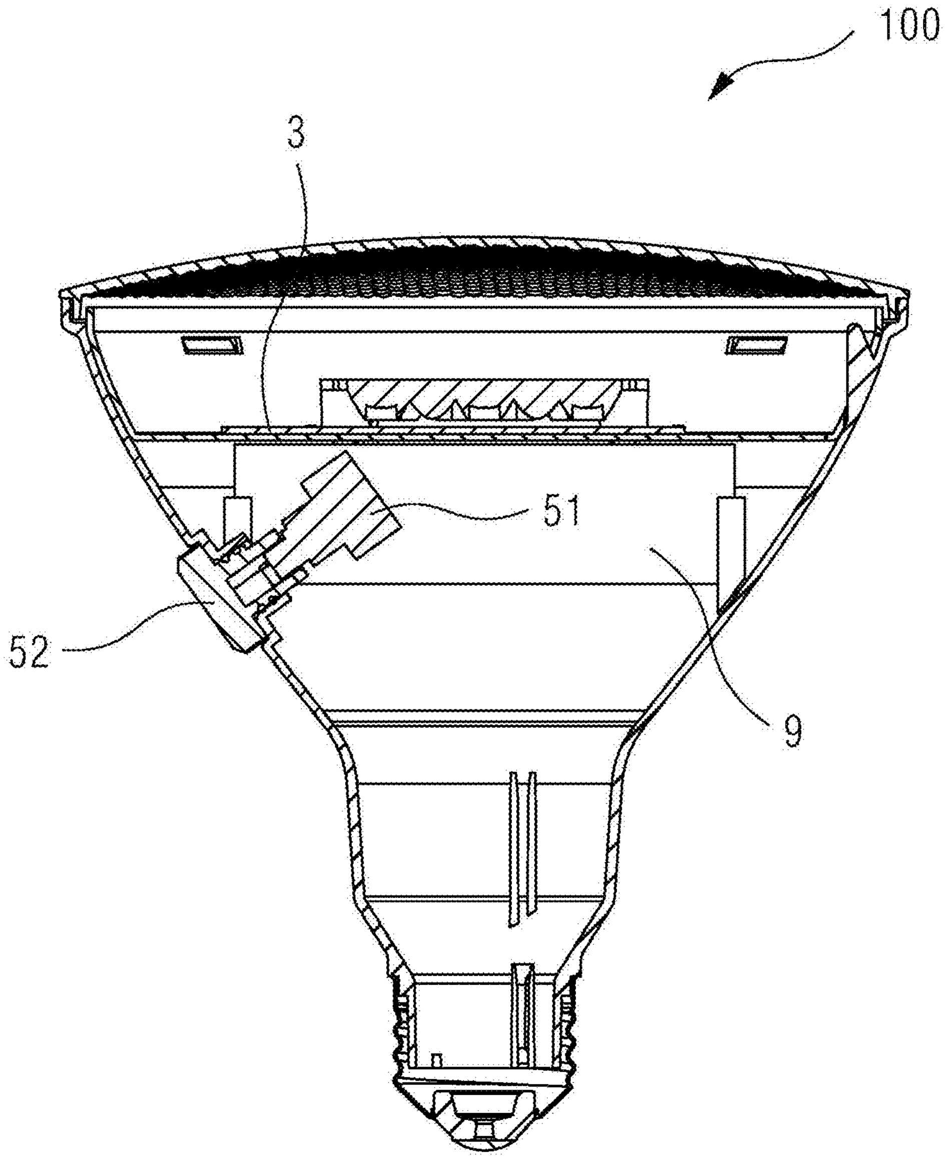
FIG. 6 is a schematic side sectional view showing the waterproof lamp in FIG. 5.

Certainly, the arrangement of the switch 51 in the present application is not limited thereto. For example, in the embodiment shown in FIGS. 5 and 6, the waterproof lamp 100 may further comprise a switch mounting plate 9, wherein the switch mounting plate 9 is connected to the light source plate 3 in a manner of intersecting with (e.g. being perpendicular to) the light source plate 3, and the switch 51 is mounted on the switch mounting plate 9. In other words, the switch 51 is indirectly electrically connected to the light source plate 3 via the switch mounting plate 9.

In the present application, the lamp housing 1 may further comprise an accommodating groove 13 recessed inwards from the circumferential side wall 11. The accommodating groove 13 may comprise a groove bottom wall 131 and a groove side wall 132 connected between the groove bottom wall 131 and the circumferential side wall 11. The through hole H1 may be provided in the groove bottom wall 131. Such an accommodating groove 13 may be directly formed in the circumferential side wall 11 of the lamp housing 1 having a cup-like shape, or may be formed in a recess recessed inwards perpendicular to the circumferential side wall 11, for example with reference to the embodiment shown in FIGS. 5 and 6. Accordingly, the axial direction of the operation knob 52 may intersect with the light source plate 3, for example at an acute angle, and the switch 51 is also correspondingly tilted and fixed on the switch mounting plate 9. In addition, such an accommodating groove 13 may also be formed in a recess recessed radially inwards from the circumferential side wall 11 of the lamp housing 1, for example, refer to the embodiment shown in FIGS. 1 to 4; accordingly, the axial direction of the operation knob 52 may be parallel to the light source plate 3. In particular, in the embodiment shown in FIGS. 1 to 4, according to the described arrangement, the accommodating groove 13 may be arranged adjacent to the housing opening 12. On the basis of such an arrangement, even in cases where the waterproof lamp 100 is mounted in place (i.e. without detaching the waterproof lamp 100), the user can also conveniently operate the operation knob 52.

In particular, the groove side wall 132 may have an annular shape, and be arranged coaxially with the cylindrical connecting portion 522. The inner diameter of the groove side wall 132 is greater than the outer diameter of the cylindrical connecting portion 522, such that an annular gap R is formed between the groove side wall 132 and the cylindrical connecting portion 522. The waterproof lamp 100 may further comprise an annular sealing plug 6 accommodated in the annular gap R. Accordingly, liquid-tight sealing between the operation knob 52 and the lamp housing 1 can be achieved.

In one embodiment, the annular sealing plug 6 may comprise at least one circumferential connecting groove 61 formed on the inner circumferential surface of the annular sealing plug 6, and the cylindrical connecting portion 522 may correspondingly comprise at least one circumferential connecting protrusion 5221 formed on the outer circumferential surface of the cylindrical connecting portion 522. Each circumferential connecting protrusion 5221 is fitted in a respective circumferential connecting groove 61. Accordingly, a tight and secure connection between the annular sealing plug 6 and the cylindrical connecting portion 522 can be achieved.

In particular, each circumferential connecting protrusion 5221 is fitted in the respective circumferential connecting groove 61 in an interference fit manner, such that when the operation knob 52 rotates, the cylindrical connecting portion 522 can rotate in the accommodating groove 13 together with the annular sealing plug 6. Of course, the arrangement of the annular sealing plug 6 in the present application is not limited thereto, and the annular sealing plug 6 may be configured to remain stationary when the user rotates the operation knob 52, that is, the operation knob 52 may rotate relative to the annular sealing plug 6.

In one embodiment, the cylindrical connecting portion 522 comprises at least one cutout 5222 at the end of the cylindrical connecting portion 522 away from the knob body 521 (i.e. the end extending into the housing inner space S), and the cylindrical connecting portion 522 may further comprise at least one clamping claw 5223 capable of protruding from the at least one cutout 5222 and snap-fitted with the groove bottom wall 131. Accordingly, in the radial direction, the operation knob 52 can be firmly held.

In one embodiment, the lamp housing 1 may also comprise an annular groove 14 recessed inwards from the circumferential side wall 11. The annular groove 14 is located at a portion of the circumferential side wall 11 abutting against the knob body 521, and the waterproof lamp 100 may further comprise a sealing ring 7 arranged in the annular groove 14. In particular, the annular groove 14 can be sleeved on the outer side of the accommodating groove 13. Accordingly, liquid-tight sealing between the operation knob 52 and the lamp housing 1 can be further achieved.

In one embodiment, the waterproof lamp 100 may further comprise a heat dissipation cup 8 arranged in the housing inner space S and connected to the lamp housing 1. The heat dissipation cup 8 may comprise a heat dissipation cup bottom wall 81 and a heat dissipation cup side wall 82 connected to each other, and the light source plate 3 is mounted on the heat dissipation cup bottom wall 81. Accordingly, the heat dissipation performance of the waterproof lamp 100 can be improved.

In particular, the heat dissipation cup 8 may further comprise at least one connecting hole H2 formed in the heat dissipation cup side wall 82, and the lamp housing 1 may correspondingly comprise at least one connecting hook 15 formed on the inner surface of the circumferential side wall 11; wherein the connecting hook 15 cooperates with a respective connecting hole H2, i.e. being hooked in the respective connecting hole H2, so as to hold the heat dissipation cup 8 in the housing inner space S.

Figure 7:
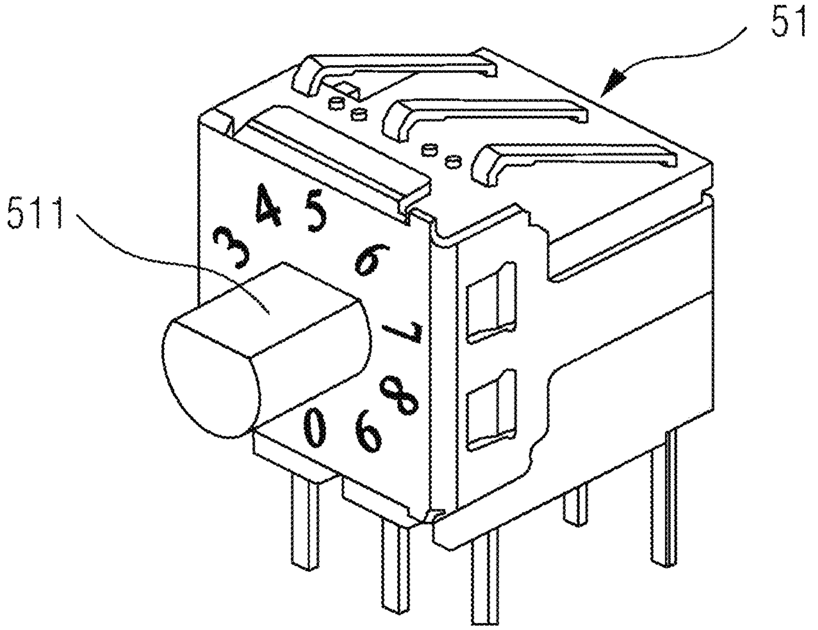
FIG. 7 is a schematic perspective view showing a switch according to one embodiment of the present application.

In one embodiment, as shown in FIG. 7, the switch 51 may be a rotary switch, and comprises a rotatable output shaft 511. The cylindrical connecting portion 522 may be coaxially fixed to the output shaft 511, such that rotation of the output shaft 511 can be driven by rotation of the cylindrical connecting portion 522.

Figure 8:
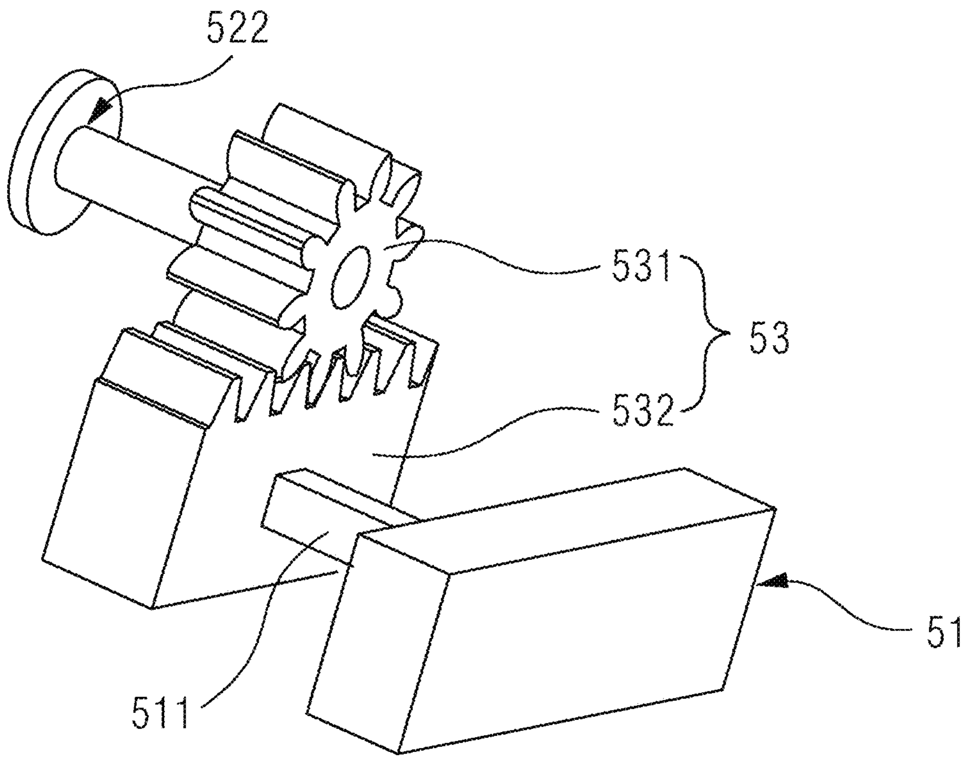
FIG. 8 is a schematic perspective view showing a switch and related mechanisms thereof according to another embodiment of the present application.

Of course, the arrangement of the switch 51 in the present application is not limited thereto. For example, in another embodiment, as shown in FIG. 8, the switch 51 may also be a toggle switch, and comprises an output shaft 511 which can move linearly. In this embodiment, the switching unit 5 may further comprise a pinion and rack mechanism 53. The pinion and rack mechanism 53 may comprise a pinion 531 and a rack 532 cooperating with each other; the pinion 531 is coaxially fixed to the cylindrical connecting portion 522, and the rack 532 is fixed to the output shaft 511, such that linear movement of the output shaft 511 can be driven by the rotation of the cylindrical connecting portion 522.

The content above merely relates to preferred embodiments of the present application and is not intended to limit the present application. For a person skilled in the art, the present application may have various modifications and variations. Any modifications, equivalent replacements, improvements, etc. made within the spirit and principle of the present application shall all belong to the scope of protection of the present application.

The invention claimed is:

1. A waterproof lamp comprising:

a lamp housing comprising a circumferential side wall enclosing a housing inner space, and the lamp housing having an opened housing opening;

a lamp cover connected to the lamp housing and covering the housing opening;

a light source plate arranged in the housing inner space; and wherein the waterproof lamp further comprises a switching unit configured to be capable of switching correlated color temperature or power of the waterproof lamp, the switching unit comprising:

a switch having a plurality of switching gears, the switch being electrically connected to the light source plate; and an operation knob, comprising a disk-shaped knob body and a cylindrical connecting portion extending from one side of the knob body, wherein the knob body is located outside the lamp housing, and a portion of the knob body abuts against the circumferential side wall, and the cylindrical connecting portion is connected to the switch through a through hole provided on the lamp housing, such that gear switching of the switch can be driven by rotation of the knob body, wherein the switch is a toggle switch comprising an output shaft configured for linear movement, and wherein the switching unit further comprises a pinion and rack mechanism including a pinion and a rack cooperating with each other, the pinion being coaxially fixed to the cylindrical connecting portion and the rack being fixed to the output shaft of the toggle switch, such that rotation of the operation knob is converted into linear movement of the output shaft via the pinion and rack mechanism.

2. The waterproof lamp according to claim 1, wherein the switch is mounted on the light source plate, the lamp housing has a neck portion connected with a lamp head to connect with a power source, and a conical housing forms an inner space where the light source plate is arranged and the through hole formed therein.

3. The waterproof lamp according to claim 2, wherein the lamp housing further comprises an accommodating groove recessed inwards from the circumferential side wall, the accommodating groove comprises a groove bottom wall and a groove side wall connected between the groove bottom wall and the circumferential side wall, the through hole is provided in the groove bottom wall, and the accommodating groove is arranged adjacent to the housing opening.

4. The waterproof lamp according to claim 2, wherein an axial direction of the operation knob is parallel to the light source plate.

5. The waterproof lamp according to claim 1, wherein the waterproof lamp further comprises a switch mounting plate, the switch mounting plate is connected to the light source plate in a manner of intersecting with the light source plate, and the switch is mounted on the switch mounting plate.

6. The waterproof lamp according to claim 5, wherein an axial direction of the operation knob intersects with the light source plate.

7. The waterproof lamp according to claim 1, wherein lamp housing further comprises an accommodating groove recessed inwards from the circumferential side wall, the accommodating groove comprises a groove bottom wall and a groove side wall connected between the groove bottom wall and the circumferential side wall, and the through hole is provided in the groove bottom wall.

8. The waterproof lamp according to claim 7, wherein the groove side wall has an annular shape and is arranged coaxially with the cylindrical connecting portion, and the inner diameter of the groove side wall is greater than the outer diameter of the cylindrical connecting portion, such that an annular gap is formed between the groove side wall and the cylindrical connecting portion.

9. The waterproof lamp according to claim 8, wherein the waterproof lamp further comprises an annular sealing plug accommodated in the annular gap.

10. The waterproof lamp according to claim 9, wherein the annular sealing plug comprises at least one circumferential connecting groove formed on the inner circumferential surface of the annular sealing plug, and the cylindrical connecting portion comprises at least one circumferential connecting protrusion formed on the outer circumferential surface of the cylindrical connecting portion, and each circumferential connecting protrusion is fitted in a respective circumferential connecting groove.

11. The waterproof lamp according to claim 10, wherein each circumferential connecting protrusion is fitted in the respective circumferential connecting groove in an interference fit manner, such that when the operation knob rotates, the cylindrical connecting portion can rotate in the accommodating groove together with the annular sealing plug.

12. The waterproof lamp according to claim 7, wherein the cylindrical connecting portion comprises at least one cutout at the end of the cylindrical connecting portion away from the knob body, and the cylindrical connecting portion further comprises at least one clamping claw capable of protruding from the at least one cutout and snap-fitted with the groove bottom wall.

13. The waterproof lamp according to claim 7, wherein the lamp housing further comprises an annular groove recessed inwards from the circumferential side wall, the annular groove is located at a portion of the circumferential side wall abutting against the knob body, and the waterproof lamp further comprises a sealing ring arranged in the annular groove, and the annular groove is sleeved on the outer side of the accommodating groove.

14. The waterproof lamp according to claim 1, wherein the lamp housing further comprises an annular groove recessed inwards from the circumferential side wall, the annular groove is located at a portion of the circumferential side wall abutting against the knob body, and the waterproof lamp further comprises a sealing ring arranged in the annular groove.

15. The waterproof lamp according to claim 1, wherein the waterproof lamp further comprises a heat dissipation cup arranged in the housing inner space and connected to the lamp housing, the heat dissipation cup comprises a heat dissipation cup bottom wall and a heat dissipation cup side wall connected to each other, and the light source plate is mounted on the heat dissipation cup bottom wall.

16. The waterproof lamp according to claim 15, wherein the heat dissipation cup further comprises at least one connecting hole formed in the heat dissipation cup side wall, and the lamp housing comprises at least one connecting hook formed on the inner surface of the circumferential side wall, wherein the connecting hook cooperates with a respective connecting hole.

17. The waterproof lamp according to claim 1, wherein the switch is a rotary switch and comprises a rotatable output shaft, the cylindrical connecting portion is coaxially fixed to the output shaft, such that rotation of the output shaft can be driven by rotation of the cylindrical connecting portion.

* * * * *